United States Patent
Coulson et al.

(10) Patent No.: US 7,441,185 B2
(45) Date of Patent: Oct. 21, 2008

(54) METHOD AND SYSTEM FOR BINARY SERIALIZATION OF DOCUMENTS

(75) Inventors: Michael J. Coulson, Clyde Hill, WA (US); Erik B. Christensen, Redmond, WA (US); Aaron A. Stern, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 484 days.

(21) Appl. No.: 11/042,555

(22) Filed: Jan. 25, 2005

(65) Prior Publication Data

US 2006/0168513 A1  Jul. 27, 2006

(51) Int. Cl.
  *G06F 17/00* (2006.01)
(52) U.S. Cl. ..................................................... 715/234
(58) Field of Classification Search ................. 715/500, 715/513, 200, 234
  See application file for complete search history.

(56) References Cited

U.S. PATENT DOCUMENTS

| | | | | |
|---|---|---|---|---|
| 4,089,026 | A * | 5/1978 | Wilhelm et al. | 348/182 |
| 5,193,181 | A * | 3/1993 | Barlow et al. | 714/2 |
| 6,072,743 | A * | 6/2000 | Amano et al. | 365/230.03 |
| 6,209,124 | B1 * | 3/2001 | Vermeire et al. | 717/114 |
| 6,671,853 | B1 * | 12/2003 | Burkett et al. | 715/513 |
| 2002/0078259 | A1 * | 6/2002 | Wendorf et al. | 709/328 |
| 2002/0112058 | A1 * | 8/2002 | Weisman et al. | 709/227 |
| 2002/0120780 | A1 * | 8/2002 | Rising et al. | 709/246 |
| 2003/0046317 | A1 * | 3/2003 | Cseri et al. | 707/513 |
| 2003/0074636 | A1 * | 4/2003 | Manepalli | 715/513 |
| 2004/0044757 | A1 * | 3/2004 | Baker | 709/223 |
| 2004/0201600 | A1 * | 10/2004 | Kakivaya et al. | 345/700 |
| 2004/0205216 | A1 * | 10/2004 | Ballinger et al. | 709/231 |
| 2004/0221261 | A1 * | 11/2004 | Blevins | 717/107 |
| 2004/0267819 | A1 * | 12/2004 | Shinkai et al. | 707/104.1 |
| 2005/0144137 | A1 * | 6/2005 | Kumar et al. | 705/55 |
| 2006/0031757 | A9 * | 2/2006 | Vincent, III | 715/513 |
| 2006/0095834 | A1 * | 5/2006 | Jeon et al. | 715/511 |
| 2006/0107199 | A1 * | 5/2006 | Kerr | 715/513 |
| 2006/0184661 | A1 * | 8/2006 | Weisman et al. | 709/224 |
| 2006/0184918 | A1 * | 8/2006 | Rosaria et al. | 717/124 |

OTHER PUBLICATIONS

Koch, Efficient Processing of Expressive Node-Selecting Queries on XML Data in Secondary Storage: A Tree Automata-based Approach, Google 2003, 1-12.*
Qin et al., Automated Synthesis of Efficient Binary Decoders for Retargetable Software Toolkits, ACM 2003, pp. 764-769.*
Bayardo et al., An Evaluation of Binary XML Encoding Optimizaitons for Fast Stream Based XML Processing, ACM May 2004, pp. 345-354.*

* cited by examiner

*Primary Examiner*—Cong-Lac Huynh
(74) *Attorney, Agent, or Firm*—Merchant & Gould PC

(57) ABSTRACT

A method for processing XML documents in a computer-based system includes associating each of a plurality of information items with a corresponding one of a plurality of binary-data units and providing a XML document associated with a XML information set comprising one or more of the plurality of information items. The method includes serializing the XML document into a binary XML format, or de-serializing the XML document from the binary XML format. Serializing includes translating the one or more information items of the XML information set into their corresponding one or more binary-data units. De-serializing includes translating one or more binary-data units of the binary XML format into their corresponding one or more information items. A computer readable medium is encoded with a program for execution on at least one processor. The program, when executed on the at least one processor, can perform the method for processing XML documents.

20 Claims, 7 Drawing Sheets

200

```
┌ ─ ─ ─ ─ ─ ┐
    Subset
     node
     210
└ ─ ─ ─ ─ ─ ┘

┌───────────┐
│StartElement│
│   220     │
└───────────┘

┌ ─ ─ ─ ─ ─ ┐
  Attribute
     230
└ ─ ─ ─ ─ ─ ┘

┌ ─ ─ ─ ─ ─ ─ ┐
 ElementContents
      240
└ ─ ─ ─ ─ ─ ─ ┘

┌ ─ ─ ─ ─ ─ ┐
  EndElement
     node
     250
└ ─ ─ ─ ─ ─ ┘
```

| Range | | Number of Bytes Used |
|---|---|---|
| From: | To: | |
| 0x00000000 | 0x0000007F | 1 byte |
| 0x00000080 | 0x00003FFF | 2 bytes, LSB stored first |
| 0x00004000 | 0x001FFFFF | 3 bytes, LSB stored first |
| 0x00200000 | 0x0FFFFFFF | 4 bytes, LSB stored first |
| 0x10000000 | 0x7FFFFFFF | 5 bytes, LSB stored first |
| (Values higher than 0x7FFFFFFF are not supported by this encoding) | | |

Range of integer space sizes for MB32 encoding

FIG. 3

| Node type | Byte value |
|---|---|
| ShortElement | 0 |
| Element | 1 |
| ShortDictionaryElement | 2 |
| DictionaryElement | 3 |
| EndElement | 4 |
| ShortAttribute | 5 |
| Attribute | 6 |
| ShortDictionaryAttribute | 7 |
| DictionaryAttribute | 8 |
| ShortXmlnsAttribute | 9 |
| XmlnsAttribute | 10 |
| ShortDictionaryXmlnsAttribute | 11 |
| DictionaryXmlnsAttribute | 12 |
| Comment | 14 |
| Subset | 15 |
| PrefixDictionaryElementA ... PrefixDictionaryElementZ | 33 ... 58 |
| PrefixElementA .. PrefixElementZ | 67 ... 92 |

Special Nodes

FIG. 4a

| Node type | Byte value |
|---|---|
| ZeroText (...WithEndElement) | 128 (150) |
| FalseText (...WithEndElement) | 129 (151) |
| TrueText (...WithEndElement) | 130 (152) |
| Int8Text (...WithEndElement) | 131 (153) |
| Int16Text (...WithEndElement) | 132 (154) |
| Int32Text (...WithEndElement) | 133 (155) |
| Int64Text (...WithEndElement) | 134 (156) |
| FloatText (...WithEndElement) | 135 (157) |
| DoubleText (...WithEndElement) | 136 (158) |
| DecimalText (...WithEndElement) | 137 (159) |
| DateTimeText (...WithEndElement) | 138 (160) |
| Chars8Text (...WithEndElement) | 139 (161) |
| Chars16Text (...WithEndElement) | 140 (162) |
| Chars32Text (...WithEndElement) | 141 (163) |
| Bytes8Text (...WithEndElement) | 142 (164) |
| Bytes16Text (...WithEndElement) | 143 (165) |
| Bytes32Text (...WithEndElement) | 144 (166) |
| StartListText (...WithEndElement) | 145 (167) |
| EndListText (...WithEndElement) | 146 (168) |
| EmptyText (...WithEndElement) | 147 (169) |
| DictionaryText (...WithEndElement) | 148 (170) |
| UniqueIDText (...WithEndElement) | 149 (171) |

Special Nodes

FIG. 4b

| Identifies | Text Node Binary Format | Comments |
|---|---|---|
| "0" | ZeroText node | |
| "true" | TrueText node | |
| "false" | FalseText node | |
| An integer (e.g. "123") | Int8Text node followed by 1 byte, or Int16Text node followed by 2 bytes, or Int32Text node followed by 4 bytes, or Int64Text node followed by 8 bytes | Signed, LSB stored first |
| A float (e.g. "1.23") | FloatText node followed by 4 bytes, or DoubleText node followed by 8 bytes | Floating point value encoded according to the IEEE 754 standard, little-endian. |
| A decimal string (e.g."123.4567") | DecimalText node | Precise floating point value encoded the same way it is encoded in the CLR ("System.Decimal" type) on Intel x86 architecture, little-endian. |
| A date/time (e.g. "10/13/2004 8:10pm") | DateTimeText node | Corresponds to the System.DateTime common language runtime ("CLR") type. A 64-bit value is written out, in the format used by System.DateTime.ToBinary(). Little-endian. |
| A list of text entries separated by whitespace (e.g. "foo bar baz") | StartList node, followed by zero, one or more Text structures | Can prohibit nesting of a list inside another list. |

FIG. 4c

METHOD AND SYSTEM FOR BINARY SERIALIZATION OF DOCUMENTS

BACKGROUND OF INVENTION

1. Field of Invention

This invention relates to methods and systems for processing electronic documents, and, in particular, to methods and systems for serializing and de-serializing electronic documents to support transmission or storage.

2. Discussion of Related Art

The eXtensible Markup Language (XML) can be used to facilitate implementation of integrated programmable World Wide Web ("Web") based services. Through the exchange of XML-related messages, services can describe their capabilities and allow other services, applications or devices to easily invoke those capabilities. The Simple Object Access Protocol (SOAP) has been developed to further this goal. SOAP is an XML-based mechanism that bridges different object models over the Internet and provides an open mechanism for Web services to communicate with one another.

XML provides a format for describing structured data, and is a markup language that is similar in form to Hyper Text Markup Language (HTML) in that it is a tag-based language. Unlike HTML, however, XML tags are not predefined, permitting greater flexibility than possible with HTML. By providing a facility to define tags and the structural relationship between tags, XML supports the creation of richly structured Web documents.

The XML standard describes a class of data objects called XML documents and partially describes the behavior of computer programs which process them. XML documents are made up of storage units called entities, which contain either parsed or unparsed data. Parsed data is made up of characters, some of which form character data, and some of which form markup. Markup encodes a description of the document's storage layout and logical structure. XML provides a mechanism to impose constraints on the storage layout and logical structure.

XML "elements" are structural constructs that include a start tag, an end or close tag, and the information or content that is contained between the tags. A "start tag" is formatted as "<tagname>" and an "end tag" is formatted as "</tagname>".

In an XML document, start and end tags can be nested within other start and end tags. All elements that occur within a particular element have their start and end tags occur before the end tag of that particular element. This defines a tree-like structure. Each element forms a node in this tree, and potentially has "child" or "branch" nodes. The child nodes represent any XML elements that occur between the start and end tags of the "parent" node.

One exemplary usage of XML is the exchange of data between different entities, such as client and server computers, in the form of requests and responses. A client might generate a request for information or a request for a certain server action, and a server might generate a response to the client that contains the information or confirms whether the certain action has been performed. The contents of these requests and responses are in the form of XML documents, i.e., sequences of characters that comply with the specification of XML.

The SOAP specification defines a uniform way of passing XML-encoded data. It also defines a way to perform remote procedure calls (RPCs) using HTTP as the underlying communication protocol.

A SOAP message is an XML document that includes a mandatory SOAP envelope, an optional SOAP Header, and a mandatory SOAP Body. SOAP provides a protocol specification for invoking methods on servers, services, components and objects. SOAP codifies the existing practice of using XML and HTTP as a method invocation mechanism. The SOAP specification mandates a small number of HTTP headers that facilitate firewall/proxy filtering. The SOAP specification also mandates an XML vocabulary that is used for representing method parameters, return values, and exceptions.

SOAP provides an open, extensible way for applications to communicate using XML-based messages over the Web, regardless of what operating system, object model or language particular applications may use. SOAP facilitates universal communication by defining a simple, extensible message format in standard XML and thereby providing a way to send that XML message over HTTP.

An "XML infoset" is an abstract representation of an XML document (described at, for example, http://www.w3.org/TR/2004/REC-xml-infoset-20040204). An infoset, which includes information items, of an XML document can be viewed as the information content of the XML document, without restriction on the document's format.

An example infoset follows. The root element of the example infoset "Book" contains one attribute called "Price." The "Price" attribute has a value of "35". The root element also contains one contents node of type Text having a value of "War and Peace." The XML standard (described at, for example, http://www.w3.org/TR/REC-xml/) specifies how to serialize an infoset as text. For example, the example infoset can be serialized as follows:

<Book Price="35">War and Peace</Book>

For transmission or storage, this textual XML is typically encoded into bytes that represent the corresponding text. Some text conversion standards include ASCII Unicode, UTF8 and UTF16. For example, the above textual XML document could be transmitted via ASCII encoding, as follows:

$1^{st}$ byte transmitted: 60 (ASCII code for '<')
$2^{nd}$ byte transmitted: 66 (ASCII code for 'B')
$3^{rd}$ byte transmitted: 111 (ASCII code for 'o')
$4^{th}$ byte transmitted: 111 (ASCII code for 'o')
$5^{th}$ byte transmitted: 107 (ASCII code for 'k')
Etc . . .

Thus, typically, an in-memory representation of an XML infoset is serialized into a textual XML string; then, the characters of the textual string are encoded into corresponding bytes for transmission. In the reverse process, the received textual-related XML bytes are decoded into the corresponding textual XML string, which is de-serialized and stored to provide an in-memory representation of the XML infoset.

The in-memory representation of an XML infoset exits logically, but need not exist physically. That is, information items associated with the infoset need not exist in any physical location prior to serialization.

For example, an object-oriented language-based program can include code to serialize and/or de-serialize XML documents. For example, object-oriented code to serialize the above example could look like:

XmlWriter.WriteStartElement("Book");
XmlWriter.WriteAttribute("Price",someDatabase.LookUpPriceForBook("WarAndPeace"));
XmlWriter.WriteElementContents("War and Peace");
XmlWriter.WriteEndElement();

The "Xml.Writer" method produces the bytes representing textual XML document:

<Book Price="35">War and Peace</Book>.

The XML standard affords relatively easy serialization of XML information items, and human readable textual serialized documents. The documents, however, can be verbose and inefficient for processing.

SUMMARY OF INVENTION

Some embodiments of the invention arise from the realization that electronic-based documents can be serialized and/or de-serialized in a manner that can reduce the size of a serialized document, increase the speed of processing, and/or reduce the time required for delivery. In some of these embodiments, a XML document is serialized into a binary format through use of a dictionary that associates information items with binary-data unit identifiers. The identifiers may identify, for example, known strings, repeated strings, repeated structures, primitive types, and/or constructs.

Some embodiments utilize static and/or dynamic dictionaries. A static dictionary can include predefined associates. A dynamic dictionary can include in-band and/or out-of-band associates. In-band associations can be included in a serialized XML document while out-of-band associations can be, for example, transmitted independently of a serialized XML document that utilizes the out-of-band dictionary entries.

Thus, some embodiments of the invention provide alternate serialization formats, for example, for XML documents and SOAP messages, that trade the human readability and verbosity of standard XML for improvements in serialized document size, parsing, and generation speed.

Some of these embodiments accomplish efficient streaming of binary virtual representations of XML documents by reducing or eliminating redundant information in an XML encoding/decoding process. Redundancy can be eliminated without prior knowledge of the contents of the entire XML. A serialized document can still have direct correspondence to a textual XML document. That is, one embodiment of a binary-XML format permits use of reader and writer software whose calls look like calls to a textual XML reader or writer. A user of the calls need not be aware of the underlying binary serialization process.

Accordingly, one embodiment of the invention features a method for processing XML documents in a computer-based system. The method includes associating information items with corresponding binary-data units and providing a XML document associated with a XML information that includes one or more of the information items. The method further includes serializing the XML document into a binary XML format, or de-serializing the XML document from the binary XML format. Serializing includes translating the one or more information items of the XML information set into their corresponding one or more binary-data units. De-serializing includes translating one or more binary-data units of the binary XML format into their corresponding one or more information items.

Another embodiment of the invention features a computer readable medium encoded with a program for execution on at least one processor. The program, when executed on the at least one processor, can perform the above-described method for processing XML documents.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3 is a table showing an encoding format for integers, according to one embodiment of the invention;

FIG. 4a is a table of special node types and corresponding byte values for binary-data units that identify their associated special nodes, according to one embodiment of the invention;

FIG. 4b is a table of special node types and corresponding byte values for binary-data units, according to one embodiment of the invention;

FIG. 4c is a table that describes some characteristics of some of the text-related special nodes shown in FIG. 4b.

DETAILED DESCRIPTION

Figure 1:
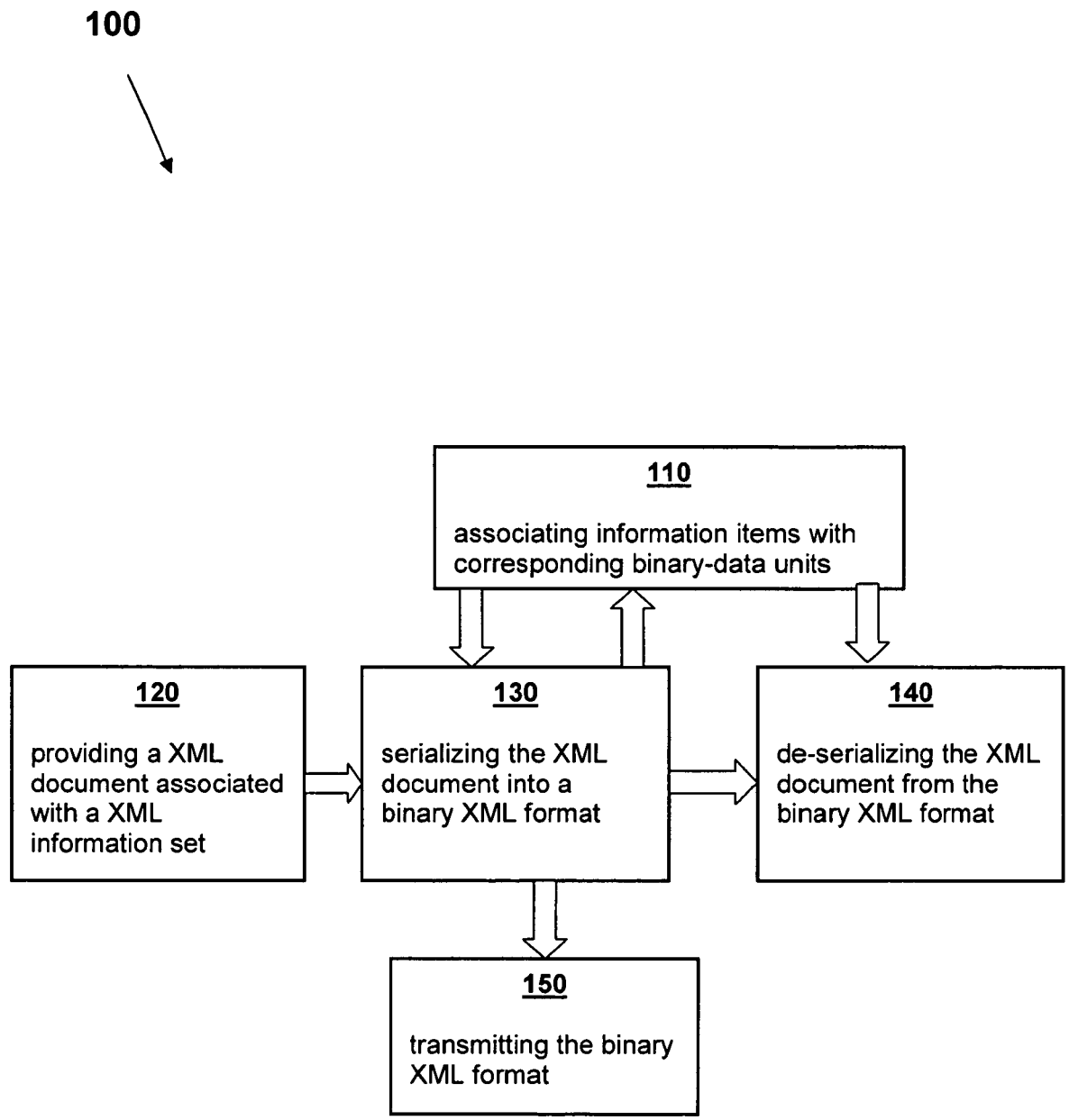
FIG. 1 is a flow diagram of a method for processing XML documents, according to one embodiment of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Reference is first made to FIG. 1 to describe some broad principles of one embodiment of the invention. FIG. 1 is a flow diagram of a method 100 for processing XML documents, according to one embodiment of the invention. The method 100 includes associating 110 information items with corresponding binary-data units, providing 120 a XML document, and serializing 130 the XML document into a binary XML format or de-serializing 140 the XML document from the binary XML format through use of the association between information items and corresponding binary-data units.

Serializing 130 the XML document into a binary XML format includes translating the one or more information items of the XML information set into their corresponding one or more binary-data units. Similarly, de-serializing 140 the XML document from the binary XML format includes translating one or more binary-data units of the binary XML format into their corresponding one or more information items. The information items can include types of information items known to those having ordinary skill in the XML arts or any other suitable types. As described in more detail below, the association between information items and binary data units can provide, among other things, more efficient processing and compact serialization of XML documents.

The information items can include, for example, primitive types, strings, text, and XML constructs, among other suitable information items described in more detail below. For convenience, the association between information items and corresponding binary-data units can be included in a dictionary. Use of the term "dictionary" is not, however, restricted to any particular format or storage preference.

Dictionaries can be used as a reference during serialization to support translation of information items into corresponding binary-data units. Examples of some suitable binary XML formats and dictionaries of associations between information items and binary-data units are described in more detail below.

The information set and its information items can conform to the standards for an infoset established by the World Wide Web Consortium ("W3C"), described, for example, a http://www.w3.org/TR/2004/REC-xml-infoset-20040204. An infoset for a well-formed XML document contains at least a document information item and several other information items, where an information item is an abstract description of some part of an XML document. Each information item has a set of associated named properties.

Figure 2:
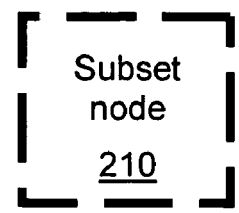
FIG. 2 is a block diagram of an element corresponding to a binary XML format, according to one embodiment of the invention.

Now referring to FIGS. 2 through 4, some embodiments of binary-XML formats are described. For convenience, representations of binary-data units and the binary-data units themselves are referred to interchangeably as identifiers of their associated information items. It will be understood, however, that an actual serialized binary XML document, according to an embodiment of the invention, includes the actual binary numbers of binary-data units corresponding to the representations.

Moreover, where components of an embodiment of a binary XML format serve a similar function to a standard XML component, the standard XML naming convention is typically used in this Detailed Description. Accordingly, one having ordinary skill in the XML arts will recognize the function of components, such as elements and attributes, and related values.

The following description includes examples of dictionary entries for various types of information items. These examples can be used in embodiments of the invention, but are intended to be illustrative rather than to limit embodiments to use of the illustrated dictionary entries. Some embodiments of the invention use fewer than all of these associations, while other embodiments include additional associations. Moreover, at least some of the specific values assigned to some binary-data units are arbitrary.

First, to provide a context for a description of some binary data-units, an embodiment of the structure of a binary-XML formatted document is described with reference to FIG. 2. FIG. 2 is a block diagram of an element 200 corresponding to the binary XML format of this illustrative embodiment. In this embodiment, a document includes one, and only one, element 200. The element 200 may, however, contain other elements.

The element 200 includes a StartElement structure 220, zero or more Attribute structures 230, and zero or more ElementContents structures 240. The element 200 has a structure that is similar to a standard XML element. For example, a corresponding XML element could appear as "<ELEM . . . > . . . </ELEM>".

The element 200 can commence with a subset node 210 and conclude with an EndElement node 250. If an EndElement node 250 is not present, the element 200 can conclude with a last ElementContents structure 240 that includes a special text node that implies the end of the element 200.

The element 200 is described in more detail below. Some examples of associations—between information items and binary-data unit—that an be used to serialize and deserialize content of the element 200 are described next.

STRINGS—One embodiment of the invention associates strings with a corresponding string identifier, which appears as a binary-data unit in a serialized document. Strings may be statically or dynamically placed in a dictionary. Static dictionary items are those which are defined prior to serialization of an XML document. In this case, a serializer and a de-serializer can agree on, or be provided with, static dictionary items before needed.

In contrast, dynamic dictionary entries are generated during the serialization process. On first encountering a string, a serializer can, for example, assign an identifier number to the string, and place both the string and an associated new string-identifier number in the serialized document. A recipient de-serializer can then place the new string and associated identifier number in a dictionary for later reference. Repeated occurrences of the same string can then be serialized through use of only the binary-data unit of the identifier, i.e., without inclusion of the string.

As an example of this process, the string "Hello" could appear four times in a row upon first use of the string, i.e., "Hello" "Hello" "Hello" "Hello". This sequence could be translated as "Hello=7, 7, 7, 7", where the new string "Hello" has dynamically been assigned an identifier number of 7. For the method 100, the number 7 would be expressed in binary form to provide the binary-data unit associated with the string "Hello".

When a string is included in a serialized document, the string can be serialized through use of standard XML or any other suitable format. For example, a string can be serialized as a MB32-encoded integer (described below,) which indicates the length of the string in bytes, followed by the indicated number of bytes representing the string in UTF8 encoding. UTF8 is an encoding standards known to those having ordinary skill in the data serialization arts. Other suitable encoding formats can be used. The number of bytes can be zero.

One embodiment of the invention has the following rules of use for a string identifier. If an actual string is not included with the string identifier, the string must have been previously defined. For example, the string could have been defined earlier in a document or through an out-of-band mechanism. Out-of-band mechanisms include, for example, predefined static dictionary entries and dynamic dictionary entries made outside of the serialization process for a document.

Further, the scope of the definition of a string can be fixed till at least the end of a document rather than only a current XML element. String definitions can be fixed to prevent their redefinition. A last bit of the binary-data unit of a string identifier can indicate whether or not the identifier is derived from a static dictionary. This information can be used to, for example, prevent redefinition of a string in a static dictionary during serialization of a document.

PRIMITIVE TYPES—Some embodiments of the invention utilize associations between data of a primitive type and binary-data units that identify the data. As known to one having ordinary skill in the XML arts, primitive types—also called basic or simple types—include numerical constants and other data that can be expressed as a single value, including, for example, numbers and characters. Some examples of primitive types known to one having ordinary skill, include a character, an 8-bit signed integer, a short signed integer, a signed integer, a signed long integer, a decimal, a real number (single precision), a real number (double precision), and a boolean. These embodiments associate one or more primitive types with binary-data units that includes a byte to identify the primitive type and a binary representation to identify the value of the primitive type. Some primitive types and their associated binary-data units for one embodiment of the invention are described below with reference to FIG. 4a.

DATA HAVING AN EFFICIENT INTERNAL REPRESENTATION—In some embodiments, data having an efficient internal representation is associated with its internal representation. That is, such data is "translated" into itself.

For example, such data need not first be encoded as text to generate a string. Dates and times are examples of data that typically have an efficient internal representation. For example, the date "10/14/2004" could be serialized into a binary format by translating the ten characters '1', '0', '/', '1', '4', '/', '2', '0', '0' and '4' into binary bytes (requiring, for example, 8 or 16 bits for each character.) A typical internal representation of a date has 64 bits; thus, such a date appearing in a document could be serialized as its 64 bit representation in memory, saving both size and processing time.

Now referring to FIG. 3, in some embodiments, unneeded portions of the internal representation of data is eliminated in associated binary-data units. For example, conventional practice can require an integer to be represented by 4 bytes of data, i.e., requiring 4 bytes of memory. Many commonly-used integers, however, are small numbers that can fit in one or two bytes. One embodiment translates integers into associated binary-data units via an encoding scheme herein referred to as "MB32 encoding". This encoding reduces the space required to provide a binary representation of the associated integer.

FIG. 3 is a table of size ranges showing the space used for one implementation of MB32 encoding of integers. As indicated, unused bytes are eliminated from the serialized integers. Other suitable efficient conversions will be apparent to one having ordinary skill in the electronic data storage arts.

As known to one having ordinary skill, every 32-bit integer can have from one to thirty two relevant bits. For example, the decimal number 3, i.e., the binary number 11, has two relevant bits, and the number 54, i.e., 110110 in binary, has six relevant bits. In one embodiment of the invention, the MB32 encoding scheme encodes relevant bits only. Moreover, each byte of a MB32 integer can be encoded with the most significant bit first, and the least-significant byte (LSB) of a MB32 integer can be stored first.

In one implementation, each byte of a MB32 integer contains seven relevant bits, which can be padded with 0's if needed, and contains one "continue" bit, i.e., the most significant bit. If the continue bit is set, another byte of the MB32 encoded integer follows the current byte. A MB32 integer can be decoded into a 32-bit integer, all relevant bits from the MB32 bytes can be concatenated by using the continue bit to indicate that a next byte should be included.

XML CONSTRUCTS—Now referring to FIGS. 4a, 4b, and 4c, in some embodiments, some binary-data units identify information items associated with XML constructs. Thus, a XML construct that repeatedly appears may be more efficiently serialized in a binary format via representation as a shortcut, i.e., its associated binary-data unit. The binary-data units that identify constructs are herein referred to as "special nodes".

FIG. 4a is a table of special node types and corresponding byte values for binary-data units, for one embodiment of the invention. Examples of special nodes are described next.

Prefix-related constructs—XML includes constructs associated with a "prefix". For example, the element <colors: blue> has a name "blue" and a prefix "colors". To serialize this construct and associated information, one conventional serialization would include a prefix-element node with the strings "colors" and "blue".

One can use one-letter prefixes to save space, such as, for the present example, <c:blue>. In one embodiment of the invention, however, a shortcut special node—an "element node prefixed with c"—is serialized with the string "blue", thus eliminating one string in the serialization, i.e., the string "colors". Some embodiments include similar special nodes for every letter, from a to z. A description of some prefix-related special nodes, listed in the table of FIG. 4a, is given next with reference again to FIG. 2.

The StartElement structure 220, of the element 200, is associated with the beginning of the element 200. A StartElement structure 220 can have one of several forms. These forms can utilize start element-related special nodes.

These special nodes support efficient serialization of various start element-related constructs. Such constructs, in this illustrative embodiment, relate to the presence of a prefix, a pre-definition (if any) of a prefix, the local name of the element 200, and a pre-definition (if any) of a string corresponding to the local name of the element 200.

For example, a StartElement structure 220 can include: no prefix and a local name that is a non-predefined string (using special node "ShortElement"); a non-predefined prefix and a local name that is a non-predefined string (using special node "Element"); no prefix and a local name that is a predefined string (using special node "ShortDictionaryElement" and a binary-data unit identifying the string); a pre-defined prefix and a local name that is a predefined string (using one of the special nodes "PrefixDictionaryElementA" through "PrefixDictionaryElementZ" and a binary-data unit identifying the string); or a non-predefined prefix and a local name that is a predefined string (using special node "DictionaryElement"); and a pre-defined prefix and a local name that is not a pre-defined string (using one of the special nodes "PrefixElementA" through "PrefixElementZ" and a string).

Attribute-related constructs—In XML, element "attributes" can be defined and assigned "values". For example, the textual XML code "<book author=smith>" assigns the value of "smith" to the "author" attribute of the "book" element. To serialize this document in a conventional manner, an attribute-assignment node would typically be included with the strings "author" and "smith". In one embodiment of the invention, a special node is created for the "author" attribute to, for example, eliminate a need to serialize the string "author" with each assignment made to this attribute.

Referring again to FIG. 2, the attribute structure 230 of the element 200 functions in correspondence to an XML attribute. As in standard XML, the attribute structure 230 can be used, for example, to associate a name-value pair with the element 200. Similar to the examples described above for start element-related constructs, attribute-related constructs can utilize attribute-related special nodes, such as those listed in the table of FIG. 4a.

For example, to assign a value of "AttributeContent" to a "LocalName" attribute, the attribute structure 230 can include one of several special nodes similar to those described above for the StartElement 220. For example, the table of FIG. 4a, provides eight attribute-related special nodes, four of which are xmlns-related, as described below. The other four attribute-related special nodes can be used in, for example, the following situations: where there is no prefix and no predefined string for the attribue (ShortAttribute), where there is an non-predefined prefix and no predefined string (Attribute), where there is no prefix and a pre-defined string for the name space(ShortDictionaryAttribute), and where there is a non-predefined prefix and a pre-defined string (DictionaryAttribute).

One commonly-occurring attribute-related construct in XML is that of assigning a value for "xmlns", the namespace attribute. In textual XML, this can appear, for example, as "<book xmlns=http://books.org>" to assign the namespace value "http://books.org" to the "xmlns" attribute of the element "book". Conventionally, in this example, to transmit this construct and associated values, an "attribute assignment node" is typically followed by both the strings "xmlns" and "http://books.org".

As shown in FIG. 4a, however, the namespace attribute construct can be represented by one or more shortcut namespace assignment special nodes. When one of the special nodes and the string "http://books.org" are included in a serialized document, the inclusion of one string, i.e., "Xmlns", is eliminated. That is, the binary format serialization includes the special node and the string associated with the Internet address.

To assign a value for "xmlns" to the namespace attribute, the attribute structure 230 can include, for example, one of the four namespace assignment special nodes shown in the table of FIG. 4a. These four shortcut xmlns-related special nodes can be used in the following situations: where there is no prefix and no predefined string for the namespace (ShortXmlnsAttribute); where there is an non-predefined prefix and no predefined string (XmlnsAttribute); where there is no prefix and a pre-defined string (ShortDictionaryXmlnsAttribute); and where there is a non-predefined prefix and a pre-defined string (DictionaryXmlnsAttribute).

Text-related constructs—FIG. 4b is a table of special node types and corresponding byte values for binary-data units that are associated with text-related information items (including some primitive types described above,) for one embodiment of the invention. The table includes associations for the following primitive types: boolean, numerical (several varieties), list, character, textual, and binary data.

The text-related special nodes of FIG. 4b are provided in pairs, including special EndElement nodes, described in more detail below. Text can be processed in a manner dependent on the type of text. For example, one embodiment provides associations for text including the following types: an empty string; a predefined string; an arbitrary string or data; and a specific type of string, such as a date/time-related string.

An empty string can be associated with the special node "EmptyText" identified by a binary-data unit having a byte value of 147, as shown in the example of FIG. 4b. A string in a dictionary can be indicated by the "DictionaryText" special node (byte value of 148), followed by an MB32-encoded integer (here, a binary-data unit) that identifies an associated string in a dictionary.

The "Chars . . . . Text" and "Binary . . . Text" special nodes support arbitrary strings and data. The "Chars . . . Text" special nodes precede alphanumeric characters, which can be encoded, for example, via UTF8 encoding. The "Binary . . . Text" special nodes precede binary data.

These special nodes include the following: "Chars8Text" or "Bytes8Text", which, when included in a serialized binary-format document, are followed by an unsigned byte, representing the number of bytes to follow, and followed by the bytes associated with the text or the data; "Chars16Text" or "Bytes16Text", which are followed by 2 bytes (unsigned LSB stored first) representing the number of bytes to follow, followed by the actual bytes; and "Chars32Text" or "Bytes32Text", followed by 4 bytes (signed, LSB stored first, negative values not allowed) representing the number of bytes to follow, followed by the actual bytes. The "Bytes . . . Text" special nodes can be followed by a direct representation of binary data, without requiring encoding.

This embodiment includes shortcut special nodes for commonly-occurring numerical values to more efficiently serialize the associated numerical values. For example, the number 0 would be conventionally serialized by typically using an "integer node" along with the number 0. The presently described illustrative embodiment, however, utilizes a special node "ZeroText" (having a binary-data unit byte value of 128) to serial the value zero, as shown in the table of FIG. 4b. The character "0" and the number "0" can be represented by the same special node because they typically have the same meaning in an XML document and thus can be used interchangeably.

FIG. 4c is a table that describes some characteristics of some of the text-related special nodes shown in FIG. 4b. These include special nodes for specific text strings, such as "0" text, described above, as well as "true" and "false, integers, floats, decimal strings, date and time, and lists.

As mentioned above, the text-related special nodes of FIG. 4b include associated " . . . . TextWithEndElement nodes. These each have a form corresponding to their associated special node, for example, "DictionaryTextWithEndElement" and "Int16TextWithEndElement".

Referring again to FIG. 2, these structures can be used in a last ElementContents structure 240 within an element 200. An " . . . . WithEndElement" special node can be used to indicate that it is the last ElementContents structure 240 in lieu of an EndElement node 250. For example, the following two forms both serialize <foo>3</foo>:
ShortElement special node, String("foo"), Int8Text special node, byte(3), EndElement special node,
ShortElement special node, String("foo"), Int8TextWithEndElement special node, byte(3).

Thus, when a " . . . WithEndElement" special node is used instead of the associated " . . . Text" special node, an EndElement node 250 need not be used.

In view of the description of special nodes provided herein, many other special nodes, for use as binary-data units, will be apparent to one having ordinary skill in the XML arts.

If the element 200 includes multiple ElementContents structures 240, the structures 240 can be concatenated to further improve serialization efficiency. For example, if the following four example ElementContents structures 240 are included in an element 200,
1: CharsText "ABC"
2: Element "FOO"
3: CharsText "X"
4: CharsText "YZ"
they may be concatenated to appear as "<ELEM>ABC<FOO/>XYZ</ELEM>".

At least some of the text-related special nodes of FIG. 4b can utilize concatenation. For example, Chars8Text("A") followed by Chars8Text("BC") can be concatenated to "ABC" when read as a string. In some embodiments, specific string types, such as a date/time string and the value zero string, are not concatenated with neighboring nodes. For example, Int8Text(23) followed by Chars8Text("0") will not be deserialized as the number 230 when attempting to read an integer.

In some embodiments, consecutive lists are also not concatenated, and preserve their separate identities. For example, List(1,2) and List(3,4) will not deserialized as {1, 2, 3, 4} when attempting to read in an array of integers.

The ElementContent structure 240, in one embodiment of the invention, has one of three forms. An ElementContent structure 240 can itself be an element (embedded in the element 200), can include text or other data, and can be a comment node that includes a string corresponding to a comment.

Returning now to the example XML document first described in the Background section, one embodiment, of a binary XML format of the invention, would serialize this example document as follows:

$1^{st}$ byte: 0 (for the binary-data unit of the "start of a simple element" special node)

$2^{nd}$ byte: 4 (length of string to be serialized for the element name)

$3^{rd}/4^{th}/5^{th}/6^{th}$ bytes: 66, 111, 111, 107 ('B', 'o', 'o', 'k' in UTF8 encoding)

$7^{th}$ byte: 5 (for the binary-data unit of the "start of a simple attribute" special node)

$8^{th}$ byte: 5 (length of string to be transmitted for the attribute name)

$9^{th}$-$13^{th}$ bytes: 'P', 'r', 'I', 'c', 'e' (in UTF8 encoding)

$14^{th}$ byte: 131 (for the binary-data unit of the "small integer text" special node)

$15^{th}$ byte: 35 (value for the integer attribute, which need not be encoded as the characters '3' and '5')

Etc . . .

Conveniently, in some embodiments, object-oriented code that controls serialization of an infoset has method calls that follow the same pattern as conventional method calls for textual serialization. Thus, the method 100 can provide direct binary serialization of XML documents without requiring a programmer to have awareness of the processing invoked by the calls to a binary serializer and/or a binary de-serializer. For example, a set of function calls to a "Binary XML Writer" could look like:

BinaryXmlWriter.WriteStartElement("Book");
BinaryXmlWriter.WriteAttribute("Price",someDatabase.LookUpPriceForBook ("WarAndPeace"));
BinaryXmlWriter.WriteElementContents("War and Peace");
BinaryXmlWriter.WriteEndElement();

Although this could appears similar to that described in the Background section above, the "Binary XML Writer" implements the method 100 to produce binary-formatted XML, as described above.

The present invention is not limited to a specific protocol and/or format. One example protocol that may be used to implement the principles of the present invention is SOAP.

Subsets—In some embodiments of the invention, a subset is a portion of a serialized document. The subset is identified by, for example, one or more tokens contained in the document. In particular, the subset is self-contained. That is the subset does not refer to content outside of the subset to enable deserialization of the subset.

The optional subset node 210, if present, indicates that the element 200 and its contents (including an entire tree of contained elements, if any) are a subset, according to one embodiment of the invention. In the illustrative embodiment associated with the table of FIG. 4a, a subset node is identified by a binary-data unit having a byte value of 15. The subset node can also be referred to as a "tag" or a "token."

In some embodiments, the subset is demarcated by a start tag and an end tag. Some embodiments do not utilize an end tag. For example, one embodiment, which utilizes a subset node 210 as a prefix to a StartElement structure 220, requires no special node to indicate an end of the subset. In this embodiment, the end of the element indicates the end of the subset that corresponds to the element.

A subset, according to one embodiment of the invention, is a part of an XML document that can be processed independently of the remainder of the document without losing any of the meaning held by the subset. The subset does not refer to content outside of the subset.

Subsets can provide an efficient mechanism for digital signature and verification by providing a mechanism for generating and securing a section of a document that is independent of the current scope including any dictionaries that may be in scope. In particular, bytes to be signed or verified can exist sequentially in memory so they can be forwarded, for example, to consumers who are unaware of a current serialization/de-serialization scope.

In one embodiment, XML subsets are denoted in a serialized document by two tokens—one that marks the start of the subset and one that marks the end. This allows, for example, readers/writers to reset a current dictionary when a subset is encountered to ensure that processing of the subset has no dependencies on an existing scope. Once the end token is located, a prior dictionary state may be restored. This embodiment allows a reader, which de-serializes the binary XML format, to choose to expose an application programming interface (API) that leaves the presence of a subset invisible to a consumer of documents in the binary XML format, if the consumer never requests the subset.

A subset may be treated as a special portion of a document that contains the subset. In some embodiments of the invention, special processing is invoked when a subset boundary, such as the subset node, is crossed. In some of these embodiments, the special processing is the responsibility of a reader of a binary serialized document.

As described above, a user receiving a binary XML-formatted document that contains one or more subsets need not be aware of the presence of the one or more subsets. Thus, a document can be serialized with or without subsets, and later deserialized to expose the same original document. That is, the use of subsets does not change an original XML document. Only a reader or other entity that consumes binary formatted data need recognize the presence of any subsets.

Similarly, if a serialized document contains subsets, a reader (e.g., a de-serializer) can expose where the subsetting existed. Thus, for example, a reader can convert a received binary formatted document into an original XML document for processing by, for example, a software program; the reader may then also indicated to the software program the portions of the XML document that were subsetted.

A subset can have one or more of the following advantageous uses. A subset can be "cut out" from an XML document and sent to another system. The receiving system can be assured of the reliability of the subset because all of the information required to read the subset is enclosed inside the subset.

If a subset is digitally signed, it can be guaranteed that no one can tamper with the meaning of the subset by changing items that are outside the subset and are not signed. Again, this is because the subset can be guaranteed not to refer to anything outside of itself. Subsets can be nested, and can support features described above with respect to the method 100.

A serializer and a de-serializer can perform special functions when encountering subsets. For example, in one embodiment, a serializer, when serializing a subset, does not emit dictionary identifiers outside of the subset. Also, in one embodiment, a serializer, when emitting a new string during serialization of a subset, does not add content to a dictionary that is external to the subset. Further, the serializer can restore an outer dictionary when exiting a subset. In one embodiment, a serializer maintains a stack of dictionaries for nested subsets. A de-serializer can perform functions that correspond to the functions of a serializer.

In one embodiment, a subset either does not use any namespace prefixes defined in parent elements, or redefines namespace prefixes before use. A subset need not utilize any standard XML attributes that affect processing of an XML document. For example, in one embodiment, the xml:lang and xml:space attributes and qualified names used for attributes, known to those having ordinary skill in the XML arts, are re-emitted. In this embodiment, any qualified names used in ElementContents structures 240 either do not use any namespace prefixes defined in parent elements, or redefine namespace prefixes before use.

Thus, in one embodiment, a serializer re-emits all of the information defined outside of the subset that could affect data in the subset that that the serializer knows about. This can include, but is not limited to, namespace prefix declarations and standard XML attributes like xml:lang and xml:space.

In one embodiment, a deserializer, upon entering a subset, forgets all of the information defined outside of the subset that could affect the data in the subset that the deserializer knows about. This can include, but is not limited to, namespace prefix declarations and standard XML attributes like xml:lang and xml:space for nested subsets. A deserializer, upon exiting a subset, can recall all of the information defined outside of the subset that could affect the data in the subset that the serializer knows about. A deserializer can keep a stack of all of the information defined outside of the subset that could affect the data in the subset that the deserializer knows about.

When a subset is encountered, any or all currently-defined dictionary identifiers can be set aside, including those defined out-of band. When exiting a subset, the dictionary items defined inside the subset can be forgotten, and the previous dictionary items can be restored.

Figure 5:
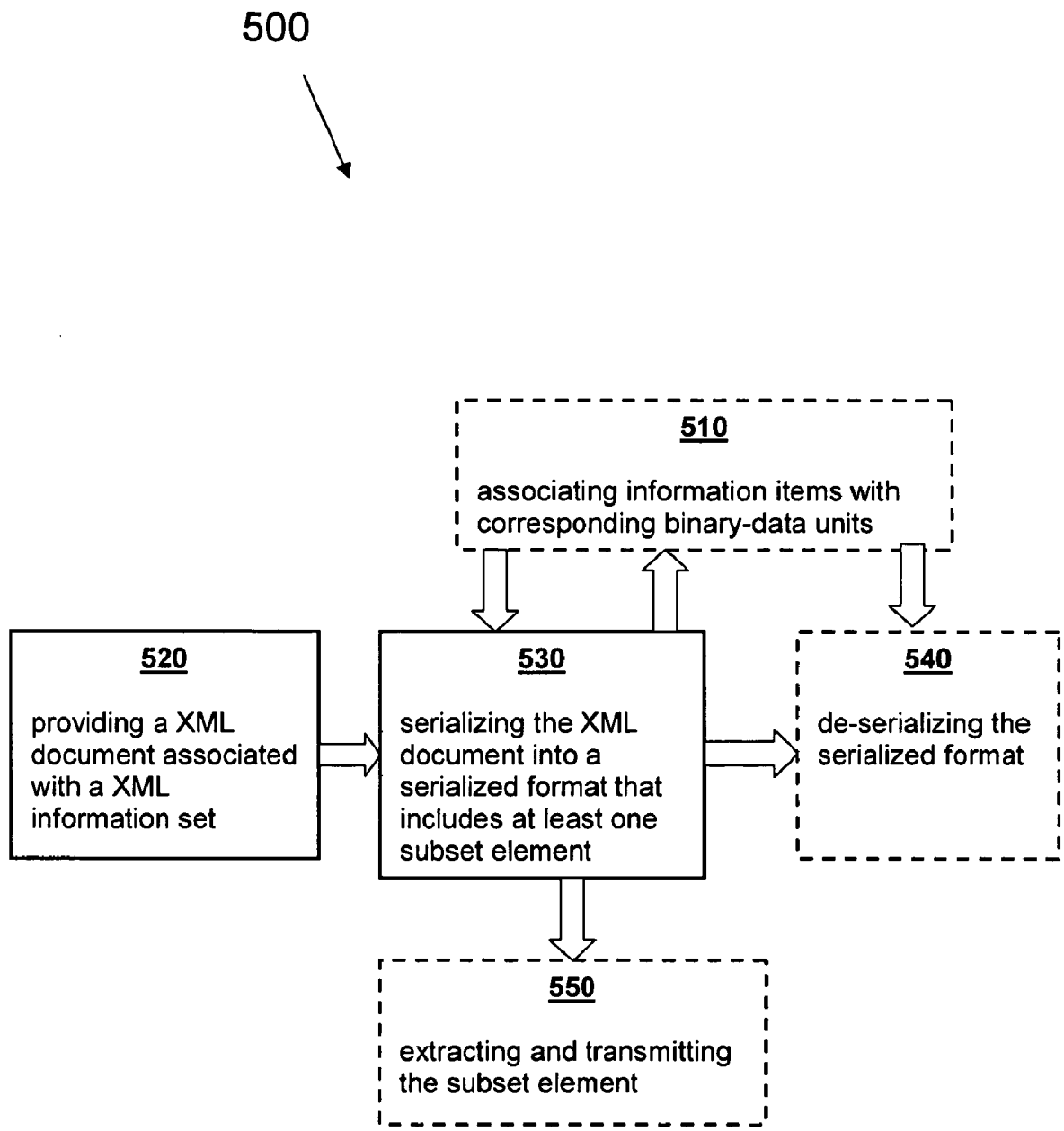
FIG. 5 is a flow diagram of a method for processing XML documents, according to one embodiment of the invention.

Now referring to FIG. 5, an example of a method that utilizes subsets for serializing documents is described. FIG. 5 is a flow diagram of a method 500 for processing XML documents, according to one embodiment of the invention. The method 500 includes providing 520 a XML document associated with a XML information set that includes one or more information items, and serializing 530 the XML document into a serialized format. The serialized format includes at least one subset element that includes a subset node. The subset node indicates that the at least one subset element can be de-serialized independently of a remainder of the XML document.

Similar to the method 100, the method 500 can include associating 510 information items with corresponding binary-data units, and can include de-serializing 540 the XML document from the serialized format through use of the association between information items and corresponding binary-data units.

A subset, such as a subset element, described above, can include all content required to de-serialize the subset element. A subset element can be de-serialized independently of the remainder of the XML document and/or extracted 550 and transmitted without the remainder of the document. Moreover, in some implementations, a scope of the subset element is independent of a scope of the XML document that contains the subset element. The subset element can have additional features of subsets, as described above.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can include physical computer-readable media such as RAM, ROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer.

When information is transferred or provided over a network or another communications connection (either hardwired, wireless, or a combination of hardwired or wireless) to a computer, a computer can view the connection as a computer-readable medium. Thus, any such a connection can be termed a computer-readable medium. Combinations of the above should also be included within the scope of computer-readable media. Computer-executable instructions include, for example, any instructions and data which cause a general purpose computer, special purpose computer, or special purpose processing device to perform a certain function or group of functions. The computer-executable instruction may be, for example, binaries, intermediate format instructions such as assembly language, or even source code.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

A computer may operate in a networked environment using logical connections to one or more remote computers. Remote computers may each be another personal computer, a server, a router, a network PC, a peer device or other common network node, and typically include many or all of the elements described above. Logical connections can include, for example, a local area network (LAN) and a wide area network (WAN) that are presented here by way of example and not limitation. Such networking environments are commonplace in office-wide or enterprise-wide computer networks, intranets and the Internet.

A computing system can be defined broadly as any hardware component or components that are capable of using software to perform one or more functions. Examples of computing systems include desktop computers, laptop computers, Personal Digital Assistants (PDAs), telephones, or any other system or device that has processing capability.

Some embodiments of the invention serialize documents as SOAP envelopes. As is well known, SOAP envelopes may be transmitted over a number of transport protocols such as, for example, HyperText Transport Protocol (HTTP), HTTP Secure (HTTPS), Simple Mail Transport Protocol (SMTP), User Datagram Protocol (UDP), Transmission Control Protocol (TCP), Bluetooth, or the like.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for processing extensible markup language (XML) documents in a computer-based system, the method comprising:

associating each of a plurality of information items with a corresponding one of a plurality of binary-data units;

providing a XML document associated with a XML information set comprising one or more of the plurality of information items, wherein the plurality of information items includes one or more information items that correspond to a date and/or a time having an internal binary code that is different than a binary code associated with a textual XML representation of the one or more information items that correspond to a date and/or a time; and serializing the XML document into a binary XML format, wherein serializing comprises translating the one or more information items of the XML information set into one or more corresponding binary-data units, the corresponding binary-data units for each of the one or more information items that corresponds to a date and/or time being the internal binary code of the date and/or time, or de-serializing the XML document from the binary XML format, wherein de-serializing comprises translating one or more binary-data units of the binary XML format into one or more corresponding information items, the corresponding information item for each of the binary-data units that corresponds to a date and/or time being the internal binary code of the date and/or time.

2. The method of claim 1, wherein serializing comprises translating the one or more information items into their corresponding binary-data units without first translating the one or more information items into a textual XML format.

3. The method of claim 1, wherein de-serializing comprises translating the one or more binary-data units of the binary XML format into their corresponding information items without first translating the one or more binary-data units into a textual XML format.

4. The method of claim 1, wherein serializing is performed without knowing a content of any of the one or more information items of the XML document beyond a current information item being serialized.

5. The method of claim 4, wherein serializing is performed without first gathering at least most of the information items associated with the XML document.

6. The method of claim 1, wherein at least one of the one or more information items has a binary-storage format, and wherein associating comprises associating the at least one of the one or more information items with its binary-storage format.

7. The method of claim 1, wherein the at least one of the one or more information items is selected from the group of items comprising a number, a character, a time, and a date.

8. The method of claim 1, wherein the one or more information items comprise one or more strings, associating comprises associating each of the one or more strings with a corresponding one of one or more string identifiers, serializing comprises translating the one or more strings into their corresponding string identifiers, and de-serializing comprises translating the one or more string identifiers into their corresponding one or more strings.

9. The method of claim 8, wherein each of the one or more string identifiers is associated with a number.

10. The method of claim 8, further comprising providing to a serializing unit and a de-serializing unit, prior to serializing, information regarding the association between at least a portion of the one or more strings and their corresponding one or more string identifiers.

11. The method of claim 8, further comprising providing to a serializing unit and a de-serializing unit, during serializing, information regarding the association between at least a portion of the one or more strings and their corresponding one or more string identifiers.

12. The method of claim 8, wherein associating comprises defining the association of a portion of the one or more strings while serializing the XML document, and including, in the serialized XML document, both the portion of the one or more strings and their corresponding one or more string identifiers to notify a de-serializing unit of the association of the portion.

13. The method of claim 1, wherein the one or more information items comprise one or more primitive types, and associating comprises associating each of the one or more primitive types with a corresponding type identifier and a corresponding binary number.

14. The method of claim 1, wherein the one or more information items comprise one or more XML constructs.

15. The method of claim 1, further comprising transmitting the binary XML format from a first unit to a second unit, wherein the first unit and the second unit are each selected from a group of unit types comprising a processor, a storage device, a client computer, and a server.

16. The method of claim 15, wherein the first unit serializes the XML document, and the second unit de-serializes the XML document.

17. The method of claim 1, wherein the serialized XML document in the binary format has a direct correspondence with a textual XML document associated with the XML document.

18. The method of claim 1, wherein the XML document is a SOAP envelope.

19. A computer readable medium encoded with a program for execution on at least one processor, the program, when executed on the at least one processor, performing a method for processing extensible markup language (XML) documents, the method comprising:

associating each of a plurality of information items with a corresponding one of a plurality of binary-data units;

providing a XML document associated with a XML information set comprising one or more of the plurality of information items, wherein the plurality of information items includes one or more information items that correspond to a date and/or a time having an internal binary code that is different than a binary code associated with a textual XML representation of the one or more information items that correspond to a date and/or a time; and serializing the XML document into a binary XML format, wherein serializing comprises translating the one or more information items of the XML information set into one or more corresponding binary-data units, the corresponding binary-data units for each of the one or more information items that corresponds to a date and/or time being the internal binary code of the date and/or time, or de-serializing the XML document from the binary XML format, wherein de-serializing comprises translating one or more binary-data units of the binary XML format into one or more corresponding information items, the corresponding information item for each of the binary-data units that corresponds to a date and/or time being the internal binary code of the date and/or time.

20. A method for processing extensible markup language (XML) documents in a computer-based system, the method comprising:

providing a XML document associated with a XML information set comprising one or more of a plurality of information items, wherein the plurality of information items includes one or more information items that are associated with one or more internal binary codes that are different than a binary code associated with a textual XML representation of the one or more information items;

identifying the one or more information items that are associated with the one or more internal binary codes;

associating the identified one or more information items that are associated with the one or more internal binary codes with their internal binary codes; and serializing the XML document into a binary XML format, wherein serializing comprises translating the one or more information items of the XML information set into one or more corresponding binary-data units, wherein the identified one or more information items that are associated with the one or more internal binary codes are translated into their internal binary codes, or de-serializing the XML document from the binary XML format, wherein de-serializing comprises translating one or more binary-data units of the binary XML format into one or more corresponding information items, wherein the identified one or more information items that are associated with the one or more internal binary codes are translated from their internal binary codes.

* * * * *